United States Patent [19]

Amsallen

[11] Patent Number: 5,448,483
[45] Date of Patent: Sep. 5, 1995

[54] ANGULAR SPEED SENSOR FILTER FOR USE IN A VEHICLE TRANSMISSION CONTROL

[75] Inventor: Marcel Amsallen, Kalamazoo, Mich.

[73] Assignee: Eaton Corporation, Cleveland, Ohio

[21] Appl. No.: 263,457

[22] Filed: Jun. 22, 1994

[51] Int. Cl.$^6$ .................. B60K 41/00; G01P 3/44
[52] U.S. Cl. .................. 364/424.1; 364/565; 73/488; 324/161; 477/175
[58] Field of Search .............. 364/424.01, 424.1, 565; 324/160, 161, 166, 172; 73/488, 489, 514, 517 A, 518; 477/80, 148, 154, 169, 175

[56] References Cited

U.S. PATENT DOCUMENTS

| | | | |
|---|---|---|---|
| 4,669,046 | 5/1987 | Kubo | 364/565 X |
| 4,745,563 | 5/1988 | Kaku et al. | 364/565 |
| 4,984,161 | 1/1991 | Nakazawa et al. | 364/424.1 |
| 4,991,100 | 2/1991 | Matsui | 324/161 X |
| 5,099,191 | 2/1992 | Hauck et al. | 324/161 |
| 5,099,443 | 3/1992 | Higashimata et al. | 364/565 |
| 5,146,162 | 9/1992 | Kamiyama et al. | 324/166 |
| 5,385,047 | 1/1995 | Cochard et al. | 73/517 A |

*Primary Examiner*—Kevin J. Teska
*Assistant Examiner*—Collin W. Park
*Attorney, Agent, or Firm*—Brooks & Kushman

[57] ABSTRACT

A filter for removing oscillations and transients from vehicle driveline component angular velocity measurement signals. The filter determines, from successive measurements of angular velocity, any angular acceleration of a driveline component. Predetermined sets of unity and fractional multipliers are assigned to respective ranges of angular acceleration. Each succeeding measurement of angular velocity is estimated by adding the product of a selected modifier value and the difference between the currently sensed and the previously estimated values of angular velocity to the previously estimated value of angular velocity. Multipliers are valued and selected so that, when angular accelerations are detected, relatively large percentages of the differences between currently sensed and previously estimated values of angular velocity are added a relatively small number of times to previously estimated values of angular velocity when the differences are relatively small. Conversely, relatively small percentages of the differences between currently sensed and previously estimated values of angular velocity are added a relatively large number of times to previously estimated values of angular velocity when the differences are relatively large.

10 Claims, 1 Drawing Sheet

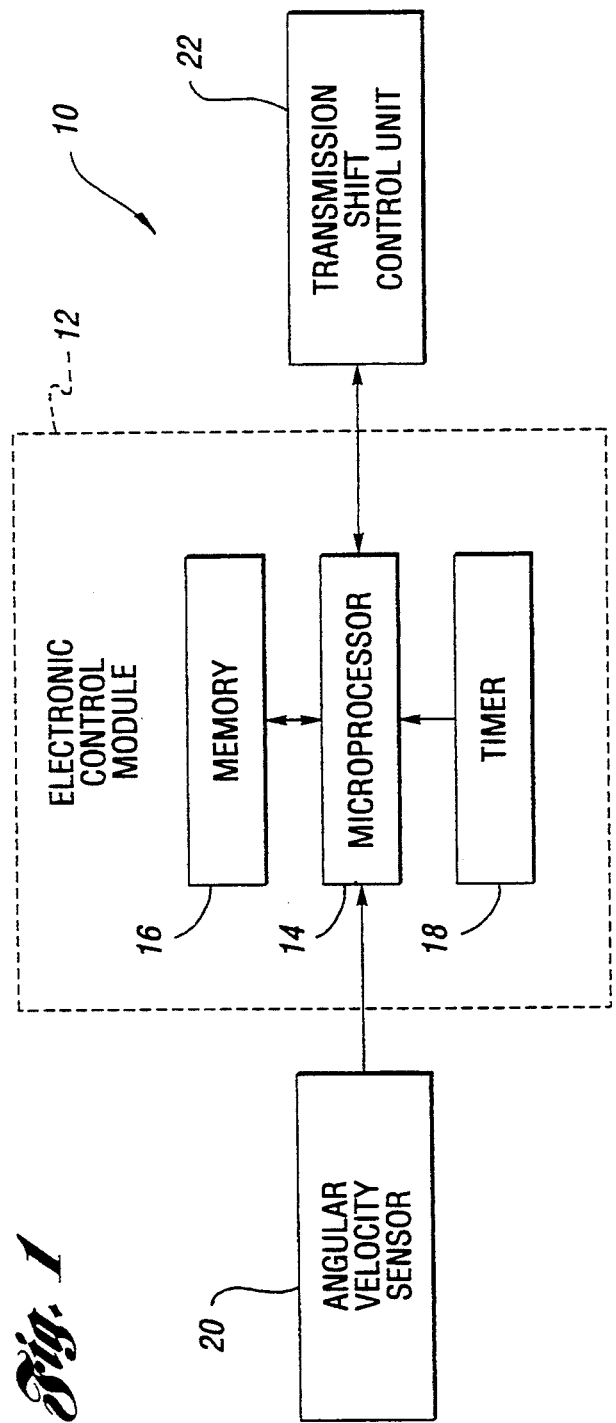

ANGULAR SPEED SENSOR FILTER FOR USE IN A VEHICLE TRANSMISSION CONTROL

TECHNICAL FIELD

This invention relates to apparatus and methods for filtering oscillations and transients from vehicle driveline component angular velocity measurement signals.

BACKGROUND ART

Due to a number of factors, including wheel slippage, driving surface inconsistencies, and driveline coupling play, the angular velocities of vehicle driveline components are subject to many oscillations and transients. Obtaining accurate measurements of the angular velocities of such components to determine true vehicle speed and acceleration is thus difficult.

Some techniques have been developed to filter angular velocity measurements, but these introduce time constants that are not tolerable in real-time, driveline component control system applications. The filtering proficiency of the present invention, however, provides accurate vehicle speed and acceleration measurements with negligible time constants.

While the prior techniques function with a certain degree of efficiency, none disclose the advantages of the improved filter of the present invention as is hereinafter more fully described.

DISCLOSURE OF THE INVENTION

An object of the present invention is to provide an improved apparatus and method for filtering effects of oscillations and transients from angular velocity measurements of a rotating member to provide accurate vehicle speed and acceleration values.

Another object of the present invention is provide an improved apparatus and method for filtering effects of oscillations and transients from angular velocity measurements of a rotating member with negligible time constants.

Still another object of the present invention is to provide an apparatus that ensures that braking systems respond properly to wheel slip conditions by approximating true vehicle speed and selecting the proper gear for existing conditions, thus preventing, while the vehicle is still moving, shifting to a starting gear because wheels have stopped rotating.

Yet another object of the present invention is to provide an apparatus that ensures proper braking system response during slip and release situations by keeping the system in gear when brakes are being pumped on slippery surfaces.

Another object of the present invention is to provide an apparatus that inhibits transmission upshifting during wheel spin conditions.

An advantage of the present invention resides in not requiring special software to attain the last of the foregoing objects.

In realizing the aforementioned and other objects and advantages, the filter of the present invention includes an angular velocity sensor for sensing the angular velocity of a rotating shaft. The sensor generates a shaft angular velocity signal representative of the shaft angular velocity. A timer is also included to define a predetermined time interval separating successive measurements of the angular velocity of the shaft.

A memory is also provided to receive the shaft angular velocity signals from the sensor and, in response, to store values representative of sensed angular velocities of the shaft. The memory also stores a plurality of sets of predetermined multiplier values. A first set thereof has a single multiplier value of unity. Each succeeding set thereof has an increasing number of multiplier values, and the multiplier values within each respective set have progressively increasing magnitudes that are less than unity. Each set is associated with a respective range of angular accelerations of the shaft.

The apparatus also includes a microprocessor to determine, from two successive values of angular shaft velocity, the angular acceleration of the shaft. The microprocessor then selects, as a function of the angular acceleration of the shaft, the respective set of multiplier values associated therewith. Next, the microprocessor then determines, based on the set of multiplier values selected and the number of times that set is successively selected, an increment to add to the previously determined angular velocity of the shaft. The sum represents an estimate of the current value of the angular velocity of the shaft.

Effectively, the microprocessor compares each newly determined acceleration value with that determined previously. If the new acceleration value is within a first predetermined range that is relatively close to the previous value, the difference is simply added to the previous value, the sum being equal to the new value. If, however, the newly determined acceleration value falls within a second predetermined range that is farther from the previous acceleration value, only a fraction of that value is added to the previous value. If the succeeding determined acceleration value still falls within the second range, a larger fraction of that value is added to the previous value.

The first range is associated with a unity multiplier; and the second range with a set of two fractional multipliers of increasing value, the smaller being applied first. Third, fourth and fifth ranges are respectively associated with third, fourth and fifth sets respectively including three, four and five fractional multipliers. The first multiplier in each succeeding set has a lower value than that of the preceding set.

The present invention thus provides the advantage of filtering oscillatory transitions and transients. It also provides the advantage of rapidly tracing sustained accelerations resulting from heavy throttle applications and hard brake applications on slippery surfaces.

The objects and advantages of the present invention are readily apparent from the following detailed description of the best mode for carrying out the invention when taken in connection with accompanying drawings.

BRIEF DESCRIPTION OF THE DRAWING

A more complete appreciation of the invention and many of the attendant advantages thereof may be readily obtained by reference to the following detailed description when considered with the accompanying drawings in which like reference characters indicate corresponding parts in all the views, wherein:

FIG. 1 is a schematic representation of the apparatus of the present invention as used to provide accurate angular velocity measurements to a vehicle transmission shift control unit; and FIG. 2 is a table illustrating successive sets of multipliers applied to estimate angular velocities of a vehicle driveline component.

BEST MODE FOR CARRYING OUT THE INVENTION

FIG. 1 of the drawing is a schematic representation of a preferred embodiment of the apparatus, generally indicated by reference numeral 10, of the present invention. An electronic control unit (ECU), or control means, 12 is shown including a microprocessor 14. The ECU 12 also includes a memory, or memory means, 16 and a timer, or timing means, 18, which are electrically connected to the microprocessor 14.

An angular velocity sensor, or sensing means, 20 is also shown electrically connected to the microprocessor 14 within the ECU 12. The sensor 20 responds to a rotation of a driveline component, such as a transmission output shaft, by generating a sensed angular velocity signal representative of the angular velocity of that component. The sensed angular velocity signal is communicated to the microprocessor 14. Filtered angular velocity measurements are communicated to a transmission shift control unit 22 or to any other device requiring accurate estimates of the angular velocity of the driveline component.

FIG. 2 of the drawing is a table showing successive sets of multipliers used to estimate angular velocities of a driveline component. These multipliers are stored in the memory 16 of the ECU 12. Each multiplier is included in a set associated with one of a plurality of acceleration ranges. A first set is associated with a range of acceleration between 0 and 100 RPM per second, a second set is associated with a range of acceleration between 100 and 200 RPM per second, and so forth, there being five sets in the preferred embodiment illustrated.

Each successive set has an increasing number of multipliers therein. The first set has one multiplier, the number of multipliers in each successive set increasing respectively with the number of the set, the fifth set having five multipliers. The multipliers within each set are, with the exception of the first set, fractions and are arranged in ascending order of magnitude. The first multiplier in each successive set is of lower magnitude than is the first multiplier of the previous set. The first multiplier of the second set, for example, is ½, that of the third set is ¼, that of the forth is 1/16, and that of the fifth set is 1/64.

In operation, the angular velocity sensor 20 senses the angular velocity of the driveline component at a predetermined interval under control of the ECU timer 18. In the preferred embodiment of the invention, the interval is between 10 and 100 milliseconds and is preferably 40 milliseconds. The microprocessor 14 determines, from the current angular velocity measurement, the previous angular velocity estimate and the time interval, any angular acceleration. This is done according to the following equation.

$$\left| \alpha = \frac{(\omega - \omega_p)}{t} \right| \quad (1)$$

where:
α = angular acceleration (RPM/second),
ω = currently sensed angular velocity (RPM),
$\omega_p$ = previously estimated angular velocity (RPM), and
t = time (seconds).

If the driveline component is undergoing an angular acceleration, the microprocessor compares that angular acceleration with the angular acceleration ranges stored in the memory 16 of the ECU 12. If the angular acceleration is less than or equal to 100 RPM per second, it corresponds to the first range; and the first multiplier set is selected. If the angular acceleration is between 100 and 200 RPM per second, it corresponds to the second range; and the second set of multipliers is selected. The same procedure is followed for the remaining three ranges and sets.

If the currently sensed angular velocity of the driveline component is, for example, 352 RPM, the previous estimated angular velocity was 350 RPM, and the time interval between measurements was 10 milliseconds, according to the angular acceleration equation (1), the angular acceleration would be 200 RPM per second. This corresponds to the second range and second set of multipliers. The microprocessor 14 selects the first multiplier (½) of the second set thereof and determines, from the current angular velocity measurement, the previous angular velocity estimate and the selected multiplier, an estimated angular velocity. This is done according to the following equation.

$$\omega_e = \omega_p + f(\omega - \omega_p) \quad (2)$$

where:
$\omega_e$ = estimated angular velocity (RPM),
$\omega_p$ = previously estimated angular velocity (RPM),
ω = currently sensed angular velocity (RPM), and
f = multiplier.

According to the estimated angular velocity equation (2), the estimated angular velocity would be 351 RPM. If the next angular velocity measurement is, for example, 353 RPM, the second multiplier (¾) of the second set would be selected. The new estimated angular velocity would then be 352.5 RPM.

While the best mode for carrying out the invention has been described in detail, those familiar with the art to which this invention relates will recognize various alternative designs and embodiments for practicing the invention as defined by the following claims.

What is claimed is:

1. Apparatus for filtering effects of oscillations and transients from angular velocity measurements of a vehicle driveline component for use in controlling shifting of a transmission, the apparatus comprising:

sensing means for sensing the angular velocity of the driveline component and generating a sensed angular velocity signal representative thereof; control means:

for storing a plurality of sets of predetermined multiplier values, each set being associated with a respective range of angular acceleration of the driveline component, for receiving the sensed angular velocity signals and determining, from two successive values of said sensed angular velocity represented thereby and separated by a predetermined time interval, said angular acceleration of the driveline component, for selecting, as a function of the angular acceleration, the respective set of multiplier values associated therewith, and for determining an increment, based on the set of multiplier values selected and the number of times said selected set is successively selected, and adding the increment to a previously determined angular velocity a of the driveline component to determine an estimate of the current angular velocity thereof; and a transmission shift control unit for controlling shifting of the transmission as a function of the estimate of the current angular velocity of the driveline component.

2. The apparatus defined by claim 1, wherein the plurality of sets of predetermined multiplier values includes a first set, having one multiplier value of unity, and a plurality of succeeding sets, each succeeding set having an increasing number of multiplier values.

3. The apparatus defined by claim 2, wherein the multiplier values within each succeeding set include a first multiplier value and a plurality of succeeding multiplier values having progressively increasing magnitudes less than unity.

4. The apparatus defined by claim 3, wherein the respective first multiplier values of the plurality of succeeding sets thereof have progressively decreasing magnitudes.

5. The apparatus defined by claim 1, wherein the predetermined interval separating measurements of the angular velocity of the driveline component is within a range between 10 and 100 milliseconds.

6. Apparatus for filtering effects of oscillations and transients from angular velocity measurements of a vehicle driveline component for use in controlling shifting of a transmission, the apparatus comprising:

sensing means for sensing the angular velocity of the driveline component and generating a sensed angular velocity signal representative thereof;

an electronic control unit including:

timing means for defining a predetermined interval separating measurements of the angular velocity of the driveline component, memory means for receiving the sensed angular velocity signals from the sensing means and, in response, storing values representative of the sensed angular velocity, the memory means also storing a plurality of sets of predetermined multiplier values, a first set thereof having a single multiplier value of unity, each succeeding set thereof having an increasing number of multiplier values, the multiplier values within each respective set having progressively increasing magnitudes less than unity, each set being associated with a respective range of angular acceleration of the driveline component, and processing means for receiving the sensed angular velocity signals and determining, from two successive values of said sensed angular velocity represented thereby and separated by the predetermined time interval, said angular acceleration of the driveline component; for selecting, as a function of the angular acceleration, the respective set of multiplier values associated therewith; and for determining an increment, based on the set of multiplier values selected and the number of times said selected set is successively selected, and adding the increment to a previously determined angular velocity estimate of the driveline component to determine an estimate of the current angular velocity thereof; and a transmission shift control unit for controlling shifting of the transmission as a function of the estimate of the current angular velocity of the driveline component.

7. The apparatus defined by claim 6, wherein the predetermined interval separating measurements of the angular velocity of the driveline component is within a range between 10 and 100 milliseconds.

8. A method of filtering effects of oscillations and transients from angular velocity measurements of a vehicle driveline component for use in controlling shifting of a transmission, the method comprising:

(a) storing a plurality of sets of predetermined multiplier values, each set thereof being associated with a respective range of driveline component angular acceleration, the plurality of sets including a first set, having one multiplier value of unity, and a plurality of succeeding sets, each succeeding set having an increasing number of multiplier values, the multiplier values within each succeeding set having a first multiplier value and a plurality of succeeding multiplier values having progressively increasing magnitudes less than unity, the respective first multiplier values of the plurality of succeeding sets having progressively decreasing magnitudes;

(b) determining an initial value of angular velocity;

(c) determining a subsequent value of angular velocity after a predetermined interval;

(d) determining a value of angular acceleration based on the predetermined interval and a difference between the initial and subsequent values of angular velocity;

(e) selecting one of the plurality of sets of predetermined multiplier values as a function of the angular acceleration;

(f) selecting sequentially one of the multiplier values of the selected set of predetermined multiplier values as a function of the number of times said selected set has been successively selected;

(g) incrementing the initial value of angular velocity with a predetermined percentage of the difference between the initial and subsequent values of angular velocity to determine an estimate of the current angular velocity of the vehicle driveline component;

(h) controlling shifting of the transmission as a function of the estimate of the current angular velocity of the driveline component; and (i) repeating steps (c) through (h), using said estimate of the current of angular velocity each time as a new initial value to determine subsequent estimates of current angular velocities of the vehicle driveline component.

9. A system for filtering effects of oscillations and transients from angular velocity measurements of a vehicle driveline component for use in controlling shifting of a transmission, the system comprising:

means for storing a plurality of sets of predetermined multiplier values, each set thereof being associated with a respective range of driveline component angular acceleration, the plurality of sets including a first set, having one multiplier value of unity, and a plurality of succeeding sets, each succeeding set having an increasing number of multiplier values, the multiplier values within each succeeding set having a first multiplier value and a plurality of succeeding multiplier values having progressively increasing magnitudes less than unity, the respective first multiplier values of the plurality of succeeding sets having progressively decreasing magnitudes;

means for determining an initial value and subsequent values of angular velocity;

means for determining a value of angular acceleration based on the predetermined interval and a difference between the initial and subsequent values of angular velocity;

means for selecting one of the plurality of sets of predetermined multiplier values as a function of the angular acceleration;

means for sequentially selecting one of the multiplier values of the selected set of predetermined multiplier values as a function of the number of times said selected set has been successively selected;

means for incrementing the initial value of angular velocity with a predetermined percentage of the difference between the initial and subsequent values of angular velocity to determine subsequent estimates of current angular velocities of the vehicle driveline component; and means for controlling shifting of the transmission as a function of the estimate of the current angular velocity of the driveline component.

10. The system defined by claim 9, wherein the predetermined interval separating measurements of the angular velocity of the driveline component is within a range between 10 and 100 milliseconds.

* * * * *

UNITED STATES PATENT AND TRADEMARK OFFICE
CERTIFICATE OF CORRECTION

PATENT NO. : 5,448,483
DATED : September 5, 1995
INVENTOR(S) : Marcel Amsallen

It is certified that error appears in the above-indentified patent and that said Letters Patent is hereby corrected as shown below:

Column 1, line 36, After "is", insert --to--.

Claim 1, column 4, line 68, Replace "a", with --estimate--.

Signed and Sealed this

Twenty-third Day of January, 1996

*Attest:*

BRUCE LEHMAN

*Attesting Officer*   Commissioner of Patents and Trademarks